May 26, 1970  C. C. MOORE  3,513,683
APPARATUS FOR COINING A LOCKING COLLAR TO
A PREDETERMINED SHAPE AND VOLUME
Original Filed Sept. 22, 1965  2 Sheets-Sheet 2
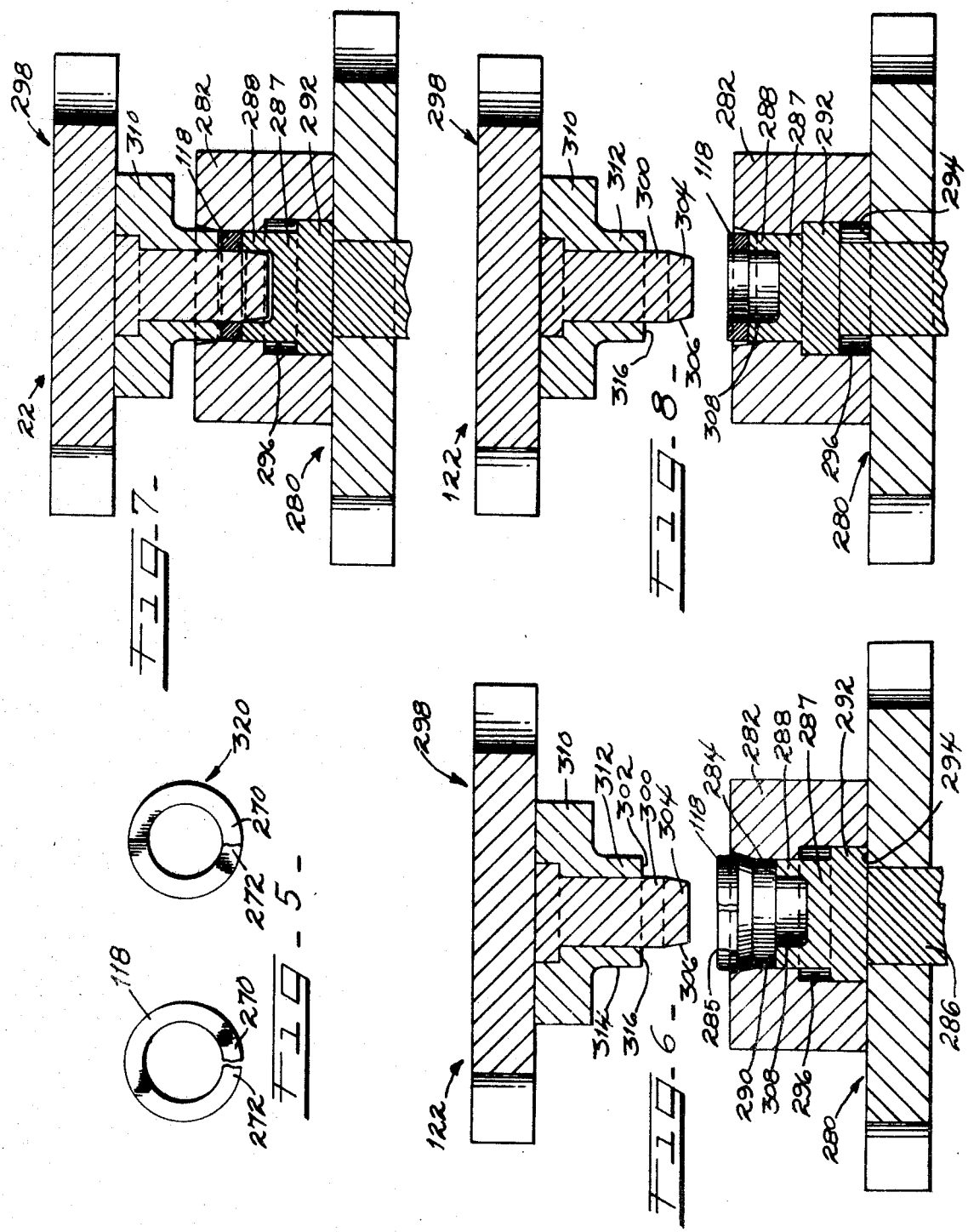
INVENTOR
CHESTER C. MOORE
BY Mann, Brown & M Williams
ATT'YS United States Patent Office 3,513,683
Patented May 26, 1970

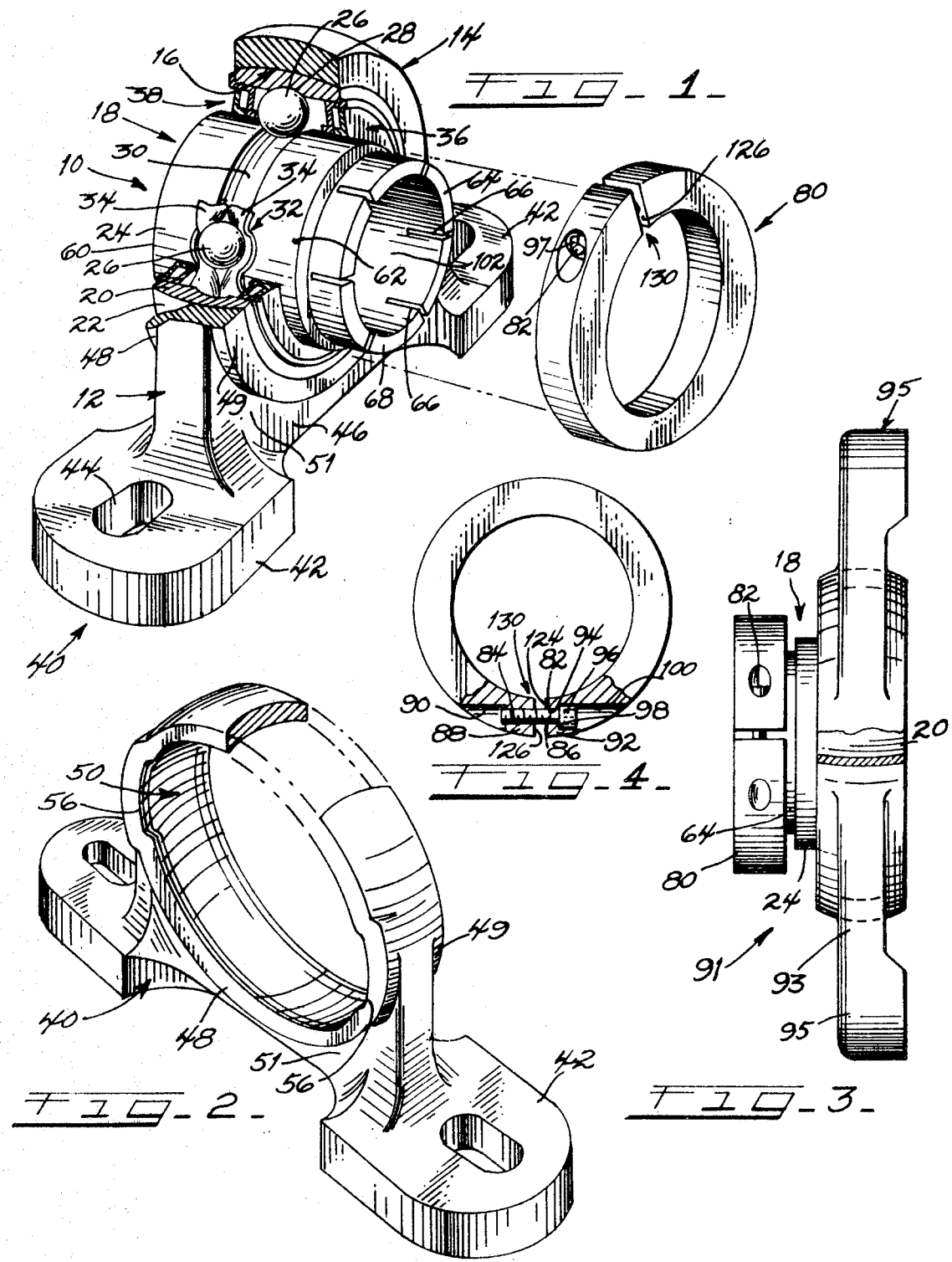

3,513,683
APPARATUS FOR COINING A LOCKING COLLAR TO A PREDETERMINED SHAPE AND VOLUME
Chester C. Moore, Aurora, Ill., assignor, by mesne assignments, to Borg-Warner Corporation, Chicago, Ill., a corporation of Delaware
Original application Sept. 22, 1965, Ser. No. 489,141, now Patent No. 3,373,472, dated Mar. 19, 1968. Divided and this application June 9, 1967, Ser. No. 661,153
Int. Cl. B21d 22/02
U.S. Cl. 72—354   2 Claims

ABSTRACT OF THE DISCLOSURE

The disclosure has to do with a method of making a ball bearing assembly and apparatus for use in making a locking collar therefor. The ball bearing assembly is concerned with using a special inner race member that receives a shaft or the like to be journalled and has at least one end of same formed with a plurality of spaced slots extending longitudinally thereof, assembling an outer race and bearing balls in abutting relation therewith, and applying a C-shaped clamping collar to the inner race slotted end portion and clamping the collar against the inner race to lock the inner race to the shaft or the like. The apparatus for use in making the locking collar involves processing a helix segment that has been formed by splitting a coiled length of bar stock wherein the resulting lock washer shaped blanks are individually coined to the final locking collar external and internal diameters by camping same between die members specially formed for this purpose.

---

This application is a division of my application Ser. No. 489,141, filed Sept. 22, 1965, now Pat. No. 3,373,472, granted Mar. 19, 1968.

My invention relates to an apparatus for coining a locking collar to a predetermined shape and volume, and more particularly, to apparatus for coining a locking collar to a predetermined shape and volume as part of a method of making locking collars for making ball bearing devices employing inner race rings and a locking collar for securing the inner race ring to a shaft.

Heretofore ball bearing units of the type shown in Richmond Pat. 3,189,979, granted June 22, 1965, have been arranged to have their inner races secured to the shaft by set screws or by cam action devices, which not only have tended to cock the inner race somewhat off the axial center of the shaft, but also frequently in a cocked position. This has been the source of an undue amount of vibration on the shaft and bearing, and has frequently resulted in fretting corrosion that causes the inner race to become frozen to the shaft; also, a marring and moving away of the shaft itself frequently results, which sometimes results in having to replace the shaft.

A principal object of the invention of said application is to provide a bearing assembly arrangement in which the inner race may be firmly secured to the shaft in perfect axial alignment therewith.

A principal object of the invention is to provide, for a method of making locking collars for use in connection with ball bearing assemblies apparatus for coining a locking collar to a predetermined shape and volume that helps make locking collars in a manner that substantially reduces the cost of manufacture of the bearing and provides a product of uniformly high quality characteristics.

Other objects of the invention are to provide improved procedures in connection with the making of locking collars, and to provide a locking collar arrangement that is economical of manufacture, efficient and long lived in use and susceptible of a wide variety of applications.

Other objects, uses, and advantages will be obvious or become apparent from a consideration of the following detailed description and the application drawings.

In the drawings:

FIG. 1 is a perspective view, partially in section, showing a completed ball bearing pillow block type unit of the type to which this invention relates, showing the locking collar of this unit displaced from its locking position on the bearing assembly inner race;

FIG. 2 is a perspective view, partially in section, showing one form of pillow block housing that may be used in the fabrication of pillow block ball bearing units arranged in accordance with this invention;

FIG. 3 is a side elevational view of a flange type ball bearing unit equipped with the ball bearing assembly of FIG. 1 with parts being shown in section;

FIG. 4 is a plan view of the locking collar employed in connection with the ball bearing assembly of FIG. 1;

FIG. 5 is a composite view showing in plan at the left side thereof the locking collar blank in the shape in which it is placed in the die of FIGS. 6–8 with the shape of the locking collar when it is removed from the die arrangement of FIGS. 6–8 being illustrated at the right hand side of the view; and FIGS. 6–8 illustrate a die arrangement for coining the locking collar blank to its predetermined external and internal diameters, with these three figures showing separate steps during the operation of the dies.

However, it is to be distinctly understood that the specific drawing illustrations provided are supplied primarily to comply with the requirements of the Patent Code, and that the invention may have other specific embodiments which are intended to be covered by the appended claims.

GENERAL DESCRIPTION OF BEARING UNIT

Referring now more specifically to FIGS. 1–4 of the drawings, reference numeral 10 generally indicates a pillow block ball bearing unit of the type that may be made by practicing my invention.

The bearing unit 10 generally comprises a pillow block type housing 12 provided with an annular housing portion 14 that in the form shown is provided with a spherically contoured bearing seat 16 in which is swivably mounted a ball bearing assembly 18 arranged in accordance with this invention.

The ball bearing assembly 18 comprises an outer race 20 provided with a spherically contoured external surface or periphery 22 that is complementary to and coacts with the housing portion bearing seat 16, an inner race 24, a plurality of bearing balls 26 mounted in the ball race grooves 28 and 30 of the respective races, a suitable type of ball retainer device 32, which in the form shown comprises a pair of rings 34 that are formed and riveted or clamped together in any conventional manner to space the balls 26 equidistantly from each other, and sealing ring assemblies 36 and 38 applied between the inner and outer races on either side of the ball bearing assembly to form a seal for the bearing unit.

The housing 12 further comprises a base 40 provided with a pair of feet or lugs 42 that are formed with suitable openings 44 for the reception of mounting screws or bolts or the like. The annular housing portion 14 of the pillow block housing 12 defines an opening 50, and is connected to the feet or lugs 42 by an upstanding vertical wall portion 46, and in the form shown, the annular housing portion 14 defines end portions 48 and 49 that project beyond the side surfaces 51 of the wall portion 46.

As indicated in FIG. 2, the end portion 48 of the housing portion 14 is formed with loading slots 56 for receiving preassembled bearing assemblies 18.

The housing 12 as shown in FIG. 2 may be made in accordance with the teachings of said Richmond patent (the disclosure of which is incorporated herein by this reference), and when so made, is adapted to receive ball bearing assemblies that are assembled in accordance with this invention.

METHOD OF MAKING BEARING UNIT

The housing 12 is cast or formed from a suitable ductile or malleable material, such as ductile cast iron, modular iron, malleable cast iron, perlitic malleable iron, Moehanite, bronze, aluminum bronze or the like.

The inner race 24 is formed from steel, with the zone of the inner race that defines the raceway 30 being hardened in any suitable manner, leaving the end portions 60 and 62 unhardened, and thus relatively soft as compared to the hardened raceway. The end portion 62 is formed with an annular flange portion or extension 64 of reduced external diameter that is formed with a plurality of slots 66 that extend longitudinally of the axis of the inner race and that are equally spaced about the circumference of the inner race. The slots 66 define resilient gripping fingers 68 that are employed to clamp the inner race 24 to a shaft over which the inner race is received in the normal operating position of bearing unit 10.

The bearing assembly 18 is assembled by taking the inner race 24 and placing it within the outer race 22 and applying a plurality of bearing balls 26 therebetween in any convenient manner. The retaining rings 34 are inserted from the sides of the assembly and are riveted or clamped together in any conventional manner to properly hold the balls 26 in their proper spaced relationship within the bearing grooves. The bearing assembly is then sealed by applying the seal assemblies 36 and 38 in any known manner.

The thus assembled bearing assembly is applied to the housing 12 by turning the assembly so that its plane extends perpendicular to the plane of the housing portion 14, and then inserting the outer race 22 into the loading slots 56 until the center of the outer race is substantially aligned with the center of the bearing seat 16. The bearing assembly 18 may then be rotated 90 degrees into substantial coplanar relation with the housing portion 14, and locking collar 80 arranged and made in accordance with this invention is applied over extension 64 to serve as a device to clamp the inner race to the shaft it cooperates with. Locking collar 80 includes a cap screw 82, that has a threaded portion 84 of its stem or body 86 screw threadedly received in an end portion 88 of the collar so that the collar can be contracted against the fingers 68 to clamp the inner race to a shaft.

The locking collar end portion 88 is recessed or enlarged as at 90, and the other end portion 92 of the locking collar is formed with a bore 94 through which cap screw 82 extends, with the head 96 of the cap screw seating against a shoulder 98 that is defined by a recess 100 formed in the end portion 92.

In use, the bearing unit 10 as shown in FIG. 1 with the locking collar 80 slipped in place over the fingers 68 is applied to the shaft the bearing unit is to journal by slipping the shaft through the bore 102 of the inner race, and after the shaft and bearing unit have been appropriately positioned with respect to each other, a suitable turning tool is applied to the cap screw 82 to contact the collar 80 against the fingers 68 and draw the fingers 68 into tight clamping engagement with the shaft surface. Cap screw 82 has its head 96 formed with a suitably shaped polygonal indentation 97 adapted to cooperate with a complementarily shaped tool for this purpose.

The result is that the inner race is securely made fast to the shaft in exact axial alignment therewith and without marring or damaging the surface of the shaft in any way.

FIG. 3 shows a flange type bearing unit 91 that includes flange type housing 93 having a bearing assembly 18 including a locking collar 80 applied thereto. Housing 93 differs from housing 12 primarily in that it is provided with lugs 95 adapted for flange type bearing applications. Unit 91 is otherwise the same as unit 10, as indicated by corresponding reference numerals, assembly 18 being applied through loading slots (not shown) that are the same as loading slots 56 of FIG. 2. Unit 91 is thus assembled following the same steps described above.

The locking collar 80 is preferably made in the manner more fully described in my said application (the disclosure of which is hereby incorporated herein by this reference), the disclosure of the instant application being directed to the apparatus for coining a locking collar to a predetermined shape and volume as part of its manufacture.

As disclosed in said application, a section of bar stock 110 of square section is applied to a coiling apparatus 112 that is shown in FIGS. 5–8 of said application to coil the bar stock 110 into a tight helix, an example of which is shown at 114 in FIG. 6 of said application. The helix is removed from apparatus 112 and is split to form individual lock washer shaped collar blanks by employing the cutting apparatus 116 illustrated in FIGS. 9 and 10 of said application, after which the individual blanks 118 are flattened by employing the die apparatus shown in FIG. 12 of said application, and then the blanks are individually coined to the final locking collar external and internal diameters by employing the die apparatus 122 shown in FIGS. 6–8.

The individual locking collar blanks are then processed in the manner indicated in FIGS. 18–23 of said application to form the recesses and holes in the locking collar that receive the cap screw 82, and in the course of this processesing, the end portions 88 and 92 of the locking collar are formed with oppositely disposed planar surfaces 124 and 126 (see FIG. 4) that define the gap 130 between the end portions of the locking collar.

The individual locking collars are then tumbled and coated as may be necessary or desirable, after which the individual cap screws are applied to the respective locking collars.

COINING APPARATUS

The coining apparatus 122 (see FIGS. 6–8) comprises a fixed lower die plate structure 280 including an annular die plate 282 formed with a cylindrical coining surface or forming face 284 that is to define the external diameter of the locking collar. The coining surface 284 is formed with a tapered mouth 285 on which the element 118 is rested prior to performing the coining operation.

Associated with the lower die plate 282 is a plunger or post 286 provided with a head portion 288 that complements the configuration of the forming surface 284 and is provided with an annular upwardly facing coining surface 290 that defines one of the side surfaces of the locking collar.

The plunger or post 286 is formed with a flange portion 292 which seats as at 294 on the plate structure 280 which is supported or braced against movement in any suitable manner. The plunger or post 286 is connected to a suitable hydraulic cylinder for the purpose of moving it from the position of FIG. 6 to the position of FIG. 8 and back again, flange portion 292 operating in chamber 296 of die plate 282.

The apparatus 122 also includes an upper die plate structure 298 having affixed thereto a punch member 300 defining a cylindrical side surface 302 that forms the coining surface for the inside diameter of the locking collar. Punch member 300 at its projecting end 304 is formed with a tapered surface 306 to provide ready entry through the element 118 during the coining operation, the end 304 projecting into recess 308 that is formed in the plunger or post member 286 in the closed position of the die (see FIG. 7).

Associated with the punch member 300 is an annular plate member 310 defining a collar portion 312 having an external cylindrical surface 314 proportioned to substantially complement the cylindrical forming face 284 of die plate 282. The collar portion 312 terminates in a planar downwardly facing annular coining surface 316 which is intended to engage the upwardly facing side of the element 118 as the coining operation is completed.

The top plate structure 298 is operated by a suitable hydraulic ram arrangement to move it between the various positions illustrated in FIGS. 6–8.

In use, element 118 in the form it has assumed as a result of the operational steps described in connection with the showing of FIGS. 11 and 12 of said application is placed on the tapered mouth 285 of die plate 282, and the top plate structure 298 is then lowered (it being understood that at this point in the operation the plunger or post 285 is in the position of FIG. 6). As downward movement of the top plate structure continues, the punch member moves through the element 118 and down into and through the space defined by coining surface 284. In the meantime, the coining surface 316 of the top plate engages the upwardly facing end surface of the element 118 and the element 118 is then forced downwardly through the mouth 286 and into the space defined by coining surface 284. The top die plate structure moves to the position of FIG. 7 to fully position the element 118 within the space defined by the coining surface 284 and against the coining surface 290 of the plunger or post 286, by which point the ends 270 and 272 will have been brought into interfitting abutting relation and a material flow will have occurred filling all of the space defined by the coining surfaces 284, 290, 302 and 316, which thus gives the locking collar blank its final annular dimensioning. In practice, the final annular configuration (except for the slot 130 and the cap screw holes and recesses) including the final dimensioning of the internal and external diameters is controlled, as by employing a pressure sensitive valve in the operation of the ram that actuates the top die plate structure 298, which valve initiates a reversal in the movement of the top plate structure when a predetermined pressure is achieved.

After the coining operation is completed, the top die plate structure 298 moves back to the position of FIG. 6 (see FIG. 8) and the plunger or post 286 is actuated to move it from the position of FIG. 6 to the position of FIG. 8 to free the coined locking collar blank from the coining surface to a floor.

The locking collar blank in its new shape is indicated at 320 in FIG. 5, and it will be noted that ends 270 and 272 are tightly closed, with the saw marks in interfitting relation.

Any trademark or other identifying indicia that are to be applied to the locking collar may be appropriately applied to the coining surface 316, and it is thus contemplated that the plate 310 may be removably mounted in place so that different indicia may be applied to different locking collar blanks as may be desirable or necessary.

The locking collar blank 320 is thus now an annular planar member shaped to its final tolerances, but having its ends 270 and 272 in substantial abutting relation. In this condition, the locking collar blank is further processed as disclosed in said application to receive the cap screw and give it the necessary C-shape for the clamping purposes indicated in FIGS. 1–3 of the drawings.

It will therefore be seen that I have provided novel and effective ways of making or assembling ball bearing assemblies and units, as well as a novel effective and inexpensive method of making locking collars therefor.

The bearing assembly arrangements shown in FIGS. 1 and 3 not only affix the inner race of the bearing assembly to the shaft in substantially perfect axial alignment with the axis of the shaft, the inner race is firmly clamped against any possible movement by merely suitably positioning the cap screw 82 so that the inner race clamping fingers 68 are drawn against the shaft surface.

As I prefer to apply the ball bearing assemblies 18 to the housings 12 through the housing loading slots 56, the over-all length of the inner race, when assembled to the outer race in the manner shown in FIG. 1, must not extend at any point beyond the imaginary sphere that is defined by a projection of the contour of bearing seat 16 and outer race surface 22.

The bearing arrangements shown in FIGS. 1 and 3 of the drawings are also adapted for application to undersized or worn shafts and provided an appropriate gripping action even though the shaft tolerance difference may be in excess of two or three thousandths.

The units 10 and 91 represent only several of the specific types of housing units to which ball bearing assemblies 18 and their locking collars may be applied. Furthermore, in some applications it is not necessary that the assembly 18 be swively mounted, and in such cases the external surface of the outer race need not be spherically contoured.

It frequently happens that assemblies 18 and their locking collars 80 are sold separately from their housings, in which case the locking collars may be assembled on the respective assemblies 18 for facilitating shipping purposes.

Assemblies 18 may be applied to the housings of FIGS. 1 and 3 by following the methods of Glavan et al. Pat. 2,952,898 to provide an alternate method of making these assemblies.

The method of making the locking collar herein disclosed has been found to make it possible to produce locking collars at a fraction of the cost of making them by a straight screw machine operation. Furthermore, machining of the locking collar is held to a minimum and the dimensioning of the internal and external diameters can be achieved with a tolerance and smoothness not possible in employing a screw machine.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. Apparatus for coining a locking collar to a predetermined shape and volume, said apparatus comprising:
 a die plate defining a cylindrical bore having a mouth tapering outwardly of the axis thereof,
 an abutment member reciprocably mounted in said bore and defining a planar abutment surface extending transversely of said bore,
 a cylindrical punch member positioned in alignment with the axis of said bore and having a tapered end portion directed toward said bore,
 said punch member being mounted for movement into and out of said bore,
 said abutment member being formed with a recess proportioned to receive and substantially complement said punch member,
 said bore and said punch member having predetermined diameters in accordance with the external and internal diameters desired for the collar,
 said punch member carrying an annular abutment surface thereabout having a dimension transversely of said punch member that is substantially equivalent to the difference between said external and internal diameters,
 means for moving said punch member into and out of said bore when a locking collar is placed on said bore mouth to pass said punch member end portion through the collar and bring said punch member abutment surface into abutting relation with the collar to force said collar through said bore mouth and into coining engagement with said abutment member surface within said bore, and to withdraw the punch member from the collar, and means for moving said surface of said abutment member into alignment with said bore mouth to free the collar from the bore.

2. The apparatus set forth in claim 1 wherein:

said abutment surface is concentric with the axis of said bore, said punch member abutment surface extending transversely of said punch member.

References Cited

UNITED STATES PATENTS

| 2,751,676 | 6/1956 | Kaul. | |
|---|---|---|---|
| 3,064,507 | 11/1962 | Strugala et al. | 72—354 X |
| 3,186,209 | 6/1965 | Friedman | 10—76 X |

MILTON S. MEHR, Primary Examiner

U.S. Cl. X.R.

10—85; 72—359

PO-1050
(5/69)

UNITED STATES PATENT OFFICE
CERTIFICATE OF CORRECTION

Patent No. 3,513,683          Dated May 26, 1970

Inventor(s) Chester C. Moore

It is certified that error appears in the above-identified patent and that said Letters Patent are hereby corrected as shown below:

Column 1, line 31, for "camping" read -- clamping --; same column 1, line 63, after "assemblies" insert -- , --.
Column 2, line 16, delete "with parts being shown in section"; same column 2, line 18, after "1" insert -- , with parts being shown in section --.
Column 5, line 25, for "286" read -- 285 --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents